(12) United States Patent
Johnson (10) Patent No.: US 6,571,554 B2
(45) Date of Patent: Jun. 3, 2003

(54) HYDROSTATIC TRANSMISSION HAVING HYDRAULIC DAMPENING AND NEUTRAL BLEED MECHANISM

(75) Inventor: Kevin L. Johnson, Salem, IN (US)

(73) Assignee: Tecumseh Products Company, Tecumseh, MI (US)

( * ) Notice: Subject to any disclaimer, the term of this patent is extended or adjusted under 35 U.S.C. 154(b) by 0 days.

(21) Appl. No.: 09/842,340

(22) Filed: Apr. 25, 2001

(65) Prior Publication Data

US 2002/0157392 A1 Oct. 31, 2002

(51) Int. Cl.[7] ................................................ F16B 31/02
(52) U.S. Cl. ............................................ 60/468; 60/489
(58) Field of Search .......................... 60/468, 487, 489

(56) References Cited

U.S. PATENT DOCUMENTS

| | | |
|---|---|---|
| 3,020,890 A | 2/1962 | Grad |
| 3,132,486 A * | 5/1964 | Jonkers et al. ............... 60/468 |
| 3,831,497 A | 8/1974 | Trabbic et al. |
| 4,063,608 A | 12/1977 | Sullivan |
| 4,968,227 A | 11/1990 | Szulczewski et al. |
| 5,235,810 A * | 8/1993 | Havens ........................ 60/468 |
| 5,333,451 A | 8/1994 | Sakikawa et al. |
| 5,538,401 A | 7/1996 | Schaffner et al. |
| 5,836,159 A | 11/1998 | Shimizu et al. ............... 60/487 |
| 5,951,425 A | 9/1999 | Iida et al. ..................... 60/487 |
| 6,109,032 A | 8/2000 | Shimizu et al. ............... 60/468 |

\* cited by examiner

Primary Examiner—F. Daniel Lopez
(74) Attorney, Agent, or Firm—Baker & Daniels (57) ABSTRACT

A hydrostatic transmission including a fluid motor and a variable displacement fluid pump in fluid communication with the fluid motor and having a first and a second, much greater, fluid displacement rate. The pump is mounted on a block having a cylindrical surface, a passage through which fluid flows from the pump to the motor, and a fluid bleed hole extending from the passage to the cylindrical surface. The passage and a sump external to the pump are in fluid communication through the bleed hole and the void of an annular element disposed about and in sliding contact with the cylindrical surface when the pump is operating at its first rate and the annular element is in a first position. The bleed hole and the sump are substantially out of fluid communication when the pump is operating at its second rate and the annular element is in a second position.

24 Claims, 9 Drawing Sheets

FIG_1

FIG_7A

FIG_7B

FIG_9A

FIG_9B

HYDROSTATIC TRANSMISSION HAVING HYDRAULIC DAMPENING AND NEUTRAL BLEED MECHANISM

BACKGROUND OF THE INVENTION

1. Field of Invention

The present invention relates to hydrostatic transmissions intended primarily for use in the lawn and garden industry on tractors, riding lawnmowers, lawn and garden implements and the like.

2. Description of the Related Art

Hydrostatic transmissions transmit rotary mechanical motion, typically from an internal combustion engine, to fluid motion, typically via positive displacement pumps and motors using oil, and then back to rotary mechanical motion to rotate a drive axle in order to drive the vehicle. The hydrostatic transmission controls the output rotary mechanical motion such that varying output speeds in the forward and reverse directions are possible with a single speed input rotary mechanical motion. Such transmissions have utilized radial piston pumps and motors, axial piston pumps and motors and hybrid transmissions wherein the pump may be of one piston design, and the motor of another. The speed of the output of the transmission is typically controlled by varying the eccentricity of the pump track ring of a radial piston pump or the swash plate angle of an axial piston pump.

Hydrostatic transmissions have an inherent problem of not achieving, when placed in neutral, a condition in which the pump displacement is completely eliminated. Although the operator may shift the implement into neutral, thereby causing the hydrostatic transmission to be placed in neutral, there may still be some motion, or "creep", of the implement. During forward or reverse operation of the hydrostatic transmission, this fluid is constantly moving through the system. In neutral, ideally, the displacement of the rotating pump is zero, and no fluid flows to the motor therefrom. Thus, no motion, however slight, is imparted to the axle. Should the rotating pump still have some slight displacement in neutral, fluid in one side of the hydrostatic system will become or remain slightly pressurized and cause the motor to slowly rotate, thereby creating forward or reverse motion of the wheels. What would be desirable is a hydrostatic transmission which allows any fluid displaced by the pump to be vented out of the hydrostatic system when the hydrostatic transmission is placed in the neutral position, thereby eliminating creep.

Yet another problem associated with the use of hydrostatic transmission is the "jerking" effect created when the swash plate is moved from neutral to forward or reverse and vice versa. Dampening of the engagement or disengagement of the hydrostatic transmission would eliminate the jerking or at least "soften" the transition to and from neutral. What would be desirable is a hydrostatic transmission which includes a mechanism for dampening the response of the motor to changes in pump displacement rates as the pump approaches and leaves neutral so that such jerking would be eliminated.

SUMMARY OF THE INVENTION

An advantage provided by the present invention is that any fluid displaced by the pump in neutral is vented out of the hydrostatic system, thereby preventing the occurrence of creep in the forward or reverse direction.

An additional advantage provided by the present invention is that it dampens the effect of changes in pump displacement to and from zero by allowing a portion of the hydrostatic fluid to bleed or be vented out of the hydrostatic system as the transmission is shifted from neutral to an operative condition in forward or reverse, and vice versa.

The present invention provides a hydrostatic transmission including a fluid motor, a variable displacement fluid pump in fluid communication with the fluid motor, the pump having first fluid displacement rate and a second fluid displacement rate, the second fluid displacement rate being much greater than the first displacement rate, a block on which the pump is mounted and having a cylindrical surface, the block provided with at least one fluid passage, fluid which flows from the pump to the motor being flowed through the passage, the block provided with at least one fluid bleed hole extending from the fluid passage to the cylindrical surface of the block, a fluid sump external to the block, and an annular element disposed about and in sliding contact with the cylindrical block surface, the annular element provided with at least one void and having a first position in which the void is in fluid communication with the fluid passage through the fluid bleed hole, and a second position in which the void is substantially out of fluid communication with the fluid passage. The fluid passage and the sump are in fluid communication through the bleed hole and the void when the pump is operating at its first displacement rate and the annular element is in its first position, and the fluid bleed hole and the sump are substantially out of fluid communication when the pump is operating at its second displacement rate and the annular element is in its second position.

The present invention further provides a hydrostatic transmission including a fluid motor, a variable displacement fluid pump in fluid communication with the fluid motor, the pump having first fluid displacement rate and a second fluid displacement rate, the second fluid displacement rate being much greater than the first displacement rate, a block on which the pump is mounted, the block having a flat surface against which the pump is slidably engaged when the pump is operating at its first and second fluid displacement rates, the block provided at least one fluid passage which opens to the flat block surface, fluid which flows from the pump to the motor being flowed through the passage, a fluid sump external to the block, and means for placing the passage and the sump in fluid communication when the pump is operating at its first fluid displacement rate and providing a gradual motor response to changes between the pump first and second fluid displacement rates.

The present invention also provides a method for dampening the response of a fluid motor to changes in a fluid pump between neutral and drive positions in a hydrostatic transmission, and ensuring that no fluid is pumped by the pump to the motor in the pump neutral position, including: rotating the pump while maintaining its sliding engagement against a block having a passage therethrough; operating the rotating pump at a first displacement rate in its neutral position, in which the passage and a sump are in fluid communication, whereby fluid displaced by the pump in its neutral position is directed to the sump; gradually decreasing the fluid communication between the passage and the sump while changing from the pump neutral position to the pump drive position; operating the rotating pump at a second displacement rate greater than the first displacement rate in its drive position, in which the passage and the sump are substantially out of fluid communication, whereby fluid displaced by the pump in its drive position is directed to the motor through the passage for driving the motor; and gradually increasing the fluid communication between the passage and the sump while changing from the pump drive position to the pump neutral position.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein.

Corresponding reference characters indicate corresponding parts throughout the several views. Although the drawings represent embodiments of the present invention, the drawings are not necessarily to scale and certain features may be exaggerated in order to better illustrate and explain the present invention. The exemplifications set out herein illustrate particular embodiments of the invention such exemplifications are not to be construed as limiting the scope of the invention in any manner.

DETAILED DESCRIPTION OF THE INVENTION

For the purposes of promoting an understanding of the principles of the invention, reference will now be made to the embodiments illustrated in the drawings and specific language will be used to describe the same. It will nevertheless be understood that no limitation of the scope of the invention is thereby intended. The invention includes any alterations and further modifications in the illustrated devices and described methods and further applications of the principles of the invention which would normally occur to one skilled in the art to which the invention relates.

Figure 5:
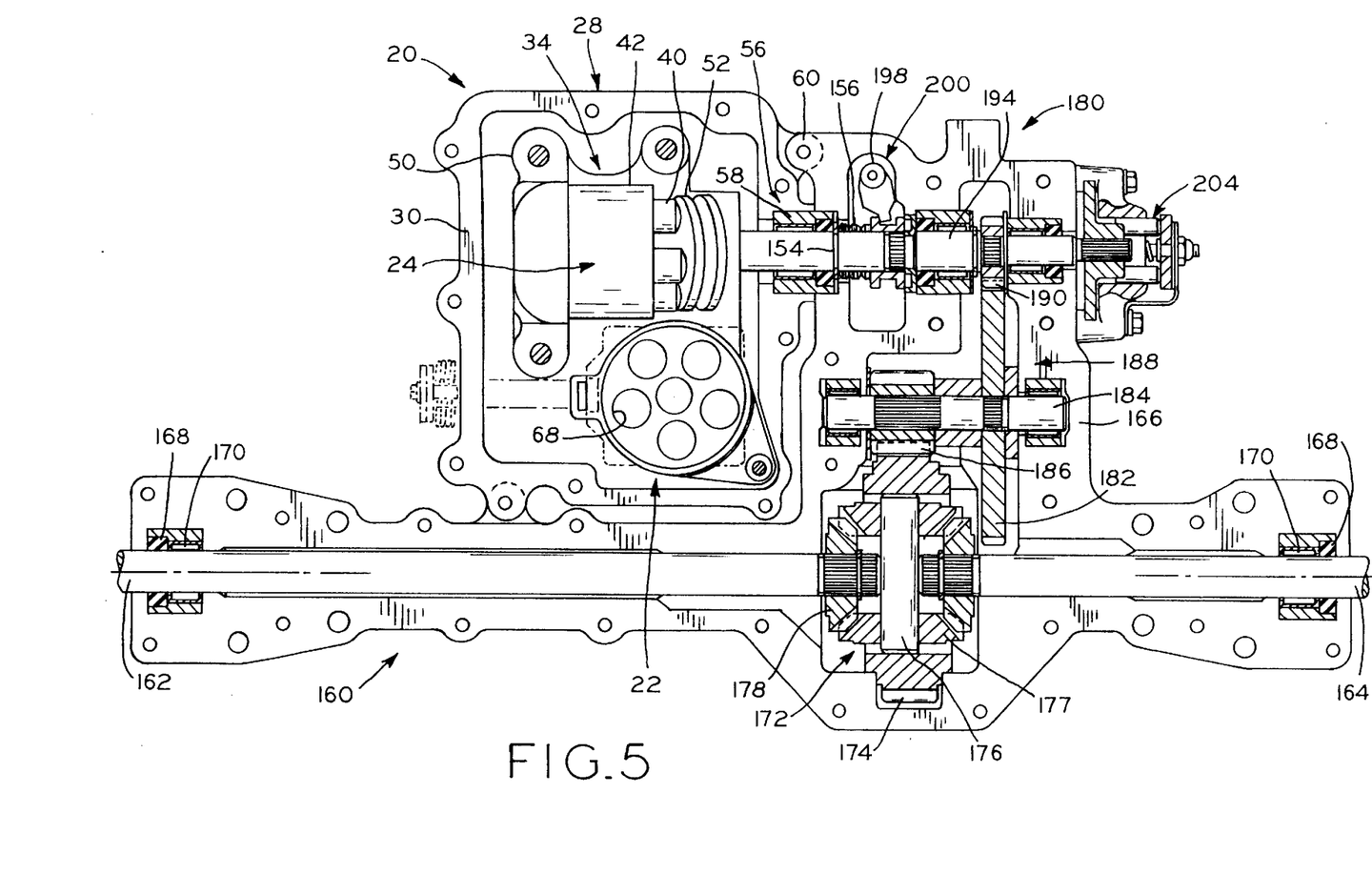
FIG. 5 is a sectional top view of the hydrostatic transmission module of FIG. 1 attached to one embodiment of a differential axle unit, the assembly forming one embodiment of hydrostatic transaxle.

Referring first to FIG. 5, transaxle 160 comprises hydrostatic transmission 20 and axle mechanism 180. Axle mechanism 180 includes casing 166 having upper and lower halves, split along a horizontal plane coincident with the axes of axles 162 and 164. Disposed within casing 166 are reduction gear train 188 and differential mechanism 172. Axles 162 and 164 extend outwardly from differential mechanism 172 through a pair of openings in either end of casing 166 at which point axles 162 and 164 are sealed by seals 168 and supported by bearings 170.

Differential mechanism 172 is of a type known in the art and includes ring gear 174, bevel gears 177 and 178, and pin 176. Differential 172 is connected to pinion 186 which is splined to countershaft 184. The opposite end of countershaft 184 is similarly splined to gear 182 which is enmeshed with pinion gear 190 splined to gear train input shaft 194.

Further included in transaxle 160 is space 198 which contains mechanical disconnect mechanism 200 of the type disclosed in U.S. Pat. No. 5,701,738, issued Dec. 30, 1997, and assigned to the assignee of the present application. The disclosure of this patent is expressly incorporated herein by reference. Additionally, transaxle 160 includes brake mechanism 204. The operation of the brake itself is the subject of U.S. Pat. No. 6,123,182, issued Sep. 26, 2000, and assigned to the assignee of the present application. The disclosure of this patent is expressly incorporated herein by reference. Transaxle 160 is further connected to hydrostatic transmission 20, as described hereinbelow.

Referring now to FIGS. 1 through 4, hydrostatic transmission 20 comprises a separate, self-contained casing 28 having two casing halves 30 and 74 split along horizontal interface 82 which is coplanar with the axis of motor output shaft 26. Casing halves 30 and 74 are connected together by a plurality of bolts 76 extending through lower casing half 74 and threadedly received in bores provided in upper casing half 30. Disposed within self-contained casing 28 is hydrostatic pump and motor mechanism 34 comprising center section, or block, 32 having pump mounting surface 128 and motor mounting surface 36 and internal passages 126 and 234 (FIG. 6A) hydraulically connecting each of arcuate slots 236 and 240 (FIG. 6A) in pump face 128 and motor mounting face 36. Pump and motor mechanism 34 further includes axial piston motor 24 and variable displacement pump 22.

Figure 3:
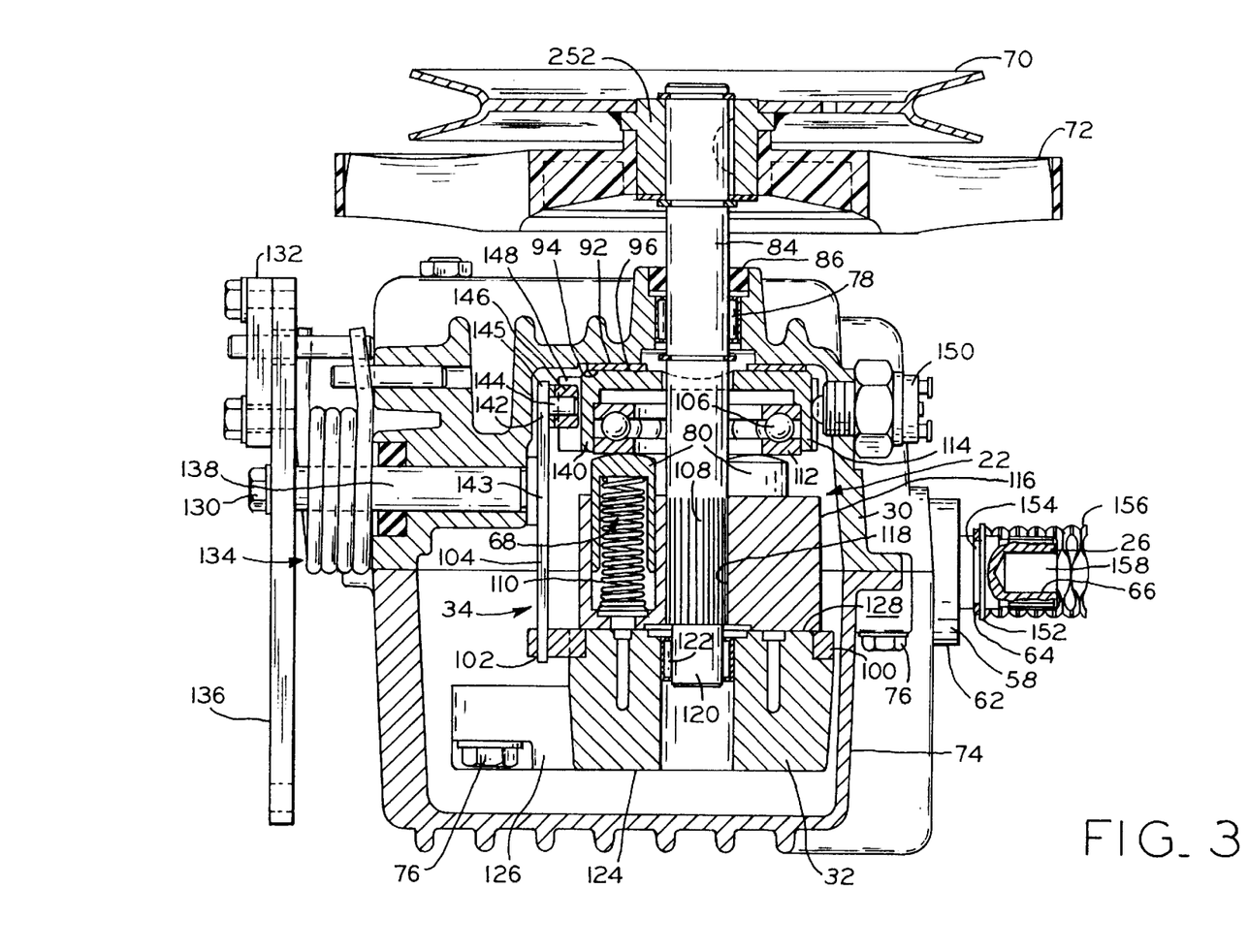
FIG. 3 is a sectional side view of the hydrostatic transmission module of FIG. 1 along line 3—3 thereof.

Axial piston motor 24 comprises rotatable cylinder 42 having a plurality of pistons 40 therein sliding against fixed swash plate assembly 54 and thrust bearing 52. Face 44 of rotatable cylinder 42 interfaces with motor mounting face 36 of center section 32. Motor output shaft 26 extends through cylinder 42 and is supported by bearings 48 in center section 32. The axis of output shaft 26 is oriented 90° relative to the axis of pump input shaft 84, as shown in FIG. 3. Motor output shaft 26 is also supported by sleeve and bearing assembly 56, particularly sleeve 58, press fitted to casing 28 and extending through portion 62 into a recess in axle casing 166.

Connection of transmission 20 with gear train 188 occurs through reduced end 158 of gear train input shaft 194 being received within bore 66 in the end of motor output shaft 26. A firm connection between shafts 194 and 26 occurs through the compression spring 156 cooperating with mechanical disconnect mechanism 200 (FIG. 5). Compression spring 156 is retained on shaft 26 by ring 64, disposed in groove 154, and flat washer 152. Transmission casing 28 is mounted to transaxle casing 166 at two locations 38 and 60 by corresponding overlapping extensions on casings 28 and 166 and bolts (not shown) which are driven from the bottom.

Figure 1:
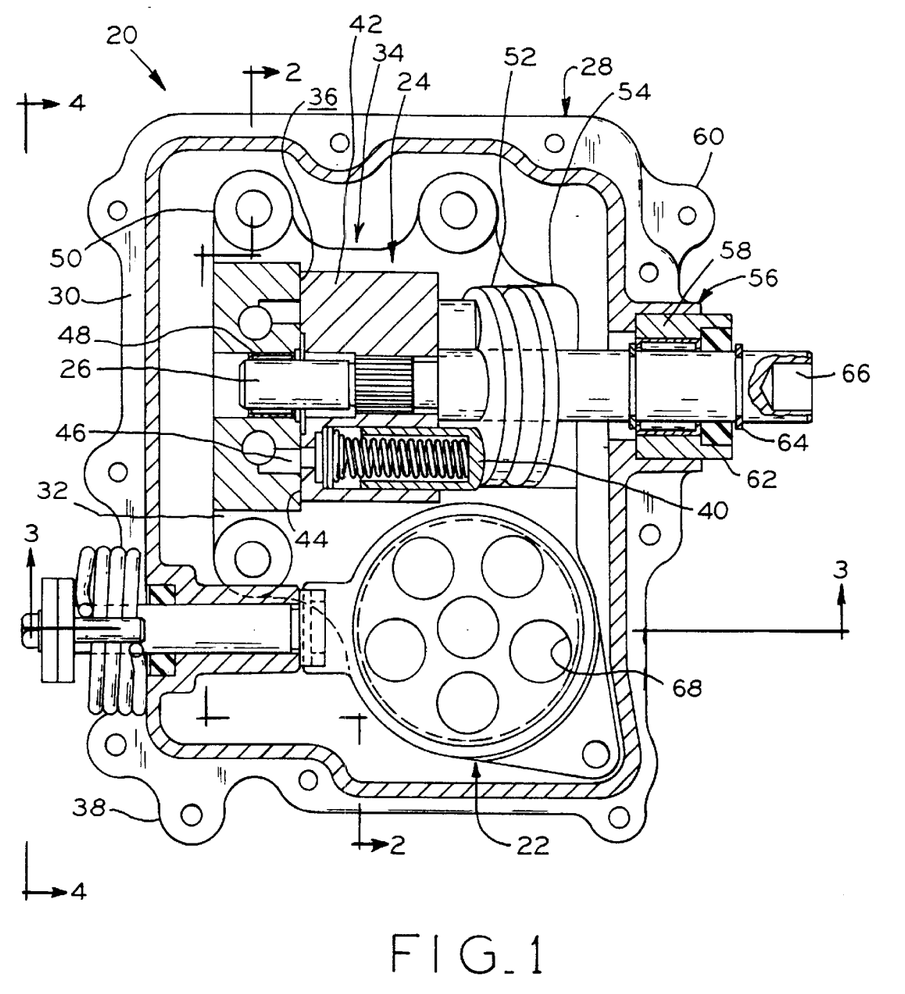
FIG. 1 is a sectional top view of one embodiment of a reversible hydrostatic transmission module according to the present invention.
Figure 2:
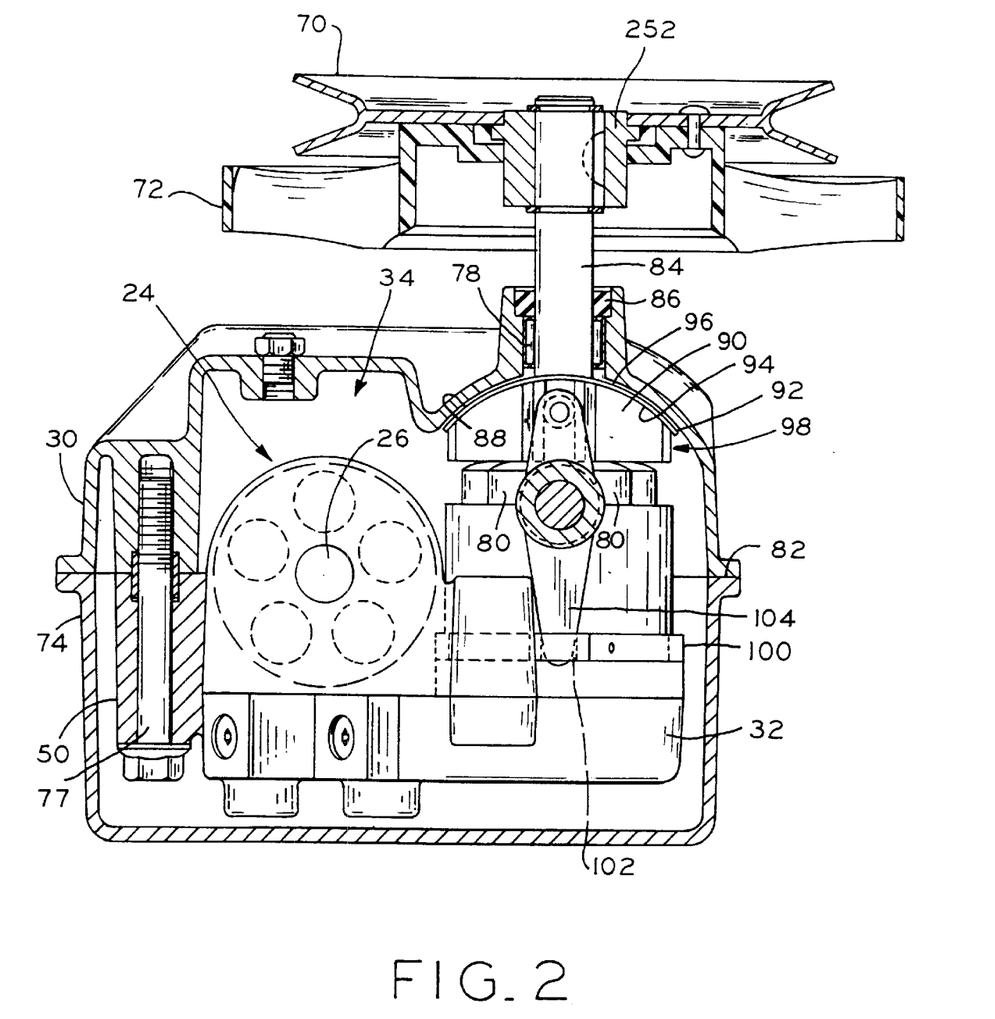
FIG. 2 is a sectional side view of the hydrostatic transmission module of FIG. 1 along line 2—2 thereof.

With reference to FIGS. 2 and 3, pump 22 is in mechanical communication with pump swash plate assembly 98, particularly swash plate 90. Swash plate assembly 98 includes swash plate 90, bearings 106, and bearing housing plates 112 and 114 encasing bearings 106. Swash plate 90 further includes arcuate bearing strips 92 with inner surfaces 94 attached to arcuate swash plate upper surface 88 and outer surface 96 interfacing with upper casing half 30. Pump swash plate assembly 98 will be tilted through the action of control rod 138 and control arm 142 (FIG. 5) in order to vary the displacement of pump 22. The operation of transmission 20 is more fully described hereinbelow.

Pump 22 includes pump cylinder 116 rotatably driven by input shaft 84 and having a plurality of cylinders 68 within which are disposed pistons 80. Pistons 80 are urged against the face of swash plate 90 by springs 110. Shaft 84 is sealed by seal 86 and is rotatably supported by bearings 78. Note that pump shaft 84 extends through swash plate assembly 98 and is splined to pump cylinder 116 via splined portion 108 on shaft 84 and splined portion 118 on pump cylinder 116. Distal end 120 of shaft 84 is supported by bearing 122 in center section 32. Screws 76 connect center section 32 to upper casing half 30. Also located on upper casing half 30 is neutral switch 150.

Figure 4:
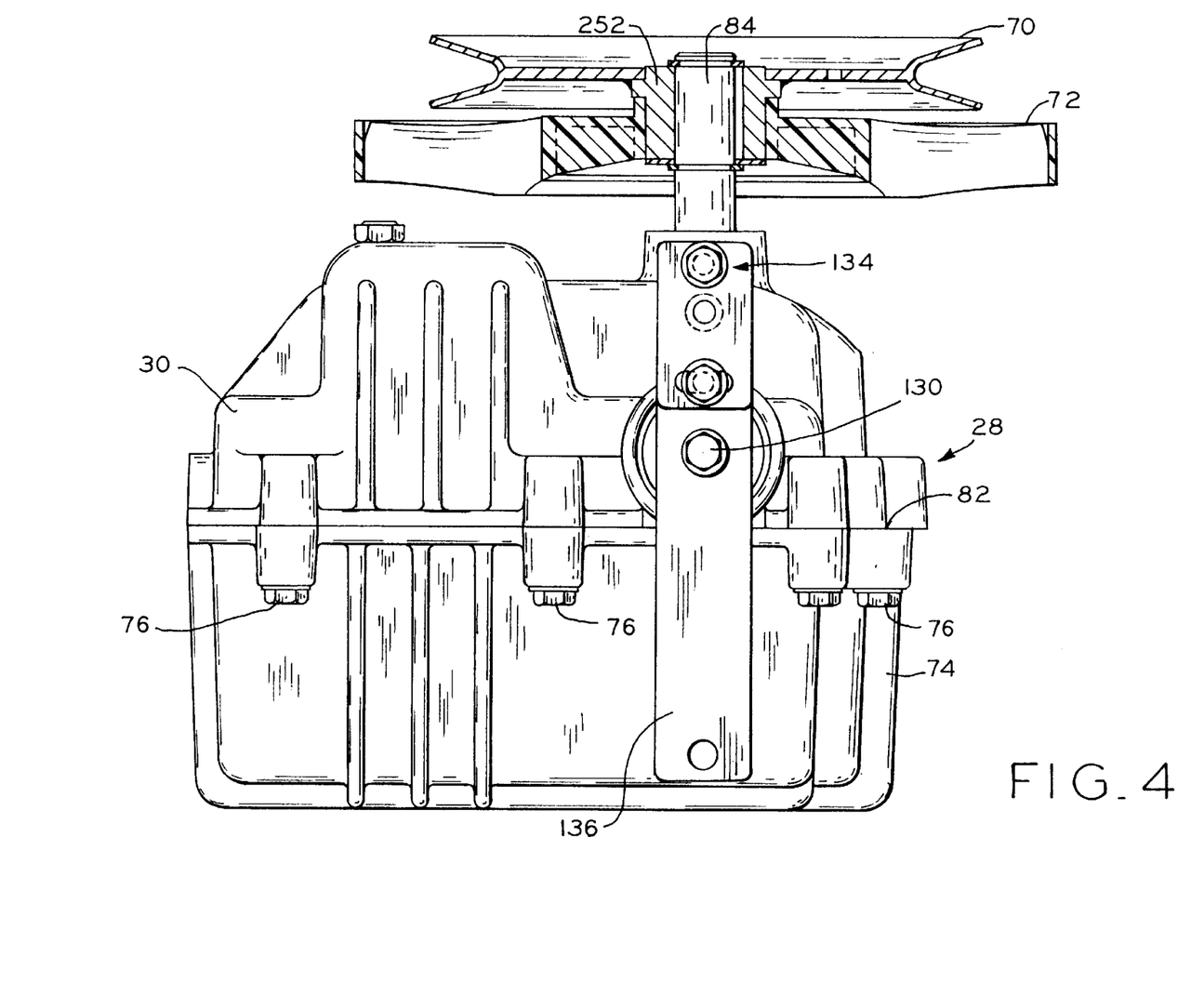
FIG. 4 is a side view of the hydrostatic transmission module of FIG. 1 along line 4—4 thereof.

Referring now to FIGS. 3 and 4, shift lever 136 is attached to rotatable control arm 142 by screw 130, external of casing 166, received in control rod 138. Shift lever 136 is returned to neutral by a conventional return-to-neutral spring mechanism 134, while adjustable plate 132 permits fine adjustment of neutral position. Control arm 142 is attached to control rod 138 and includes first end 143 extending into arm 104 and second end 145 extending in the opposite direction; both ends 143 and 145 are perpendicular to control rod 138. Second end 145 of control arm 142 swings through an arc about control rod 138 when shift lever 136 is rotated. Pin 144 attaches to second end 145 of control arm 142 and extends into slot 148 disposed on periphery 140 (FIG. 3) of swash plate 90. Friction roller 146 fits over pin 144 and freely rotates about pin 144 to engage with slot 148 of swash plate 90.

Selectively positioning control arm 142 causes swash plate 90 to tilt, and in turn, pistons 80, orbiting about input shaft 84, reciprocate causing hydrostatic fluid in each cylinder 68 to pressurize as respective piston 80 retracts. Swash plate 90 tilts and rotates against a pair of low friction bearings attached to the casing as previously described.

With reference to FIGS. 3 and 6A through 6D, lower surface 124 of center section 32 is provided with a pair of openings 238 to provide makeup oil to pump 22. In addition, a filter and check valves (not shown) are provided as is customary in the art for controlling the ingress and quality of the make-up oil. Pump input shaft 84 is received within bore 242 and integral bosses 50 of center section 32 accommodate and provide support for mounting screws 76. Blind drilled passageways 126 and 234 are sealed by plugs 232.

Figure 6A:
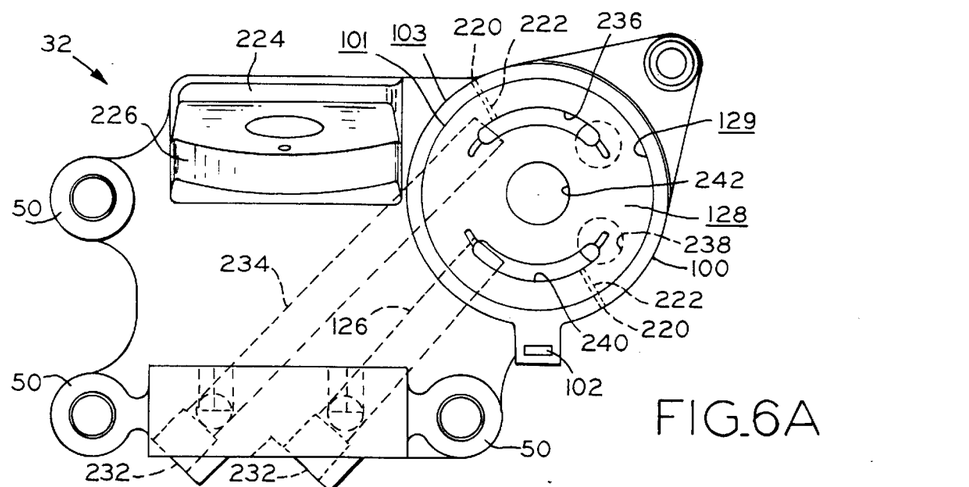
FIG. 6A is a top view of the center section or block for the hydrostatic transmission module of FIG. 1, showing a first embodiment of the inventive hydrostatic dampening and neutral bleed mechanism.

Referring to FIGS. 6A through 6D, surrounding pump mounting surface 128 of center section 32 is annular element 100 having a ring structure. Annular element 100 includes protrusion 244 containing slot 102 for receipt of arm 104. Arm 104 is allowed limited rotation due to its combination with control arm 142. Element 100, in addition to protrusion 244 and slot 102, further includes a pair of voids 220 extending from inner surface 101 of element 100 to outer surface 103 thereof. Inner surface 101 is in sliding contact with cylindrical outer surface 129 of pump mounting face 128. Cylindrical surface 129 includes a pair of fluid bleed holes 222 extending from arcuate slots 236 and 240. As stated previously, arcuate slots 236 and 240 are in fluid communication with a pair of openings in lower surface 124 of center section 32 and internal passages 234 and 126. Center section 32 also includes bearing cradle 224 having raised shoulder 226 (FIG. 6A). The structure and operation of bearing cradle 224 is disclosed in U.S. patent application Ser. No. 09/498,692, filed Feb. 7, 2000, the complete disclosure of which is incorporated herein by reference.

Arm 104, which may be an extension of control arm 142, moves annular element 100 to a position in which voids 220 and fluid bleed holes 222 are radially aligned, thereby allowing the motive fluid to vent from the hydrostatic fluid circuit to the interior of casing 28 when transmission 20 is in neutral. As stated above, control arm 142 has first end 143, which is the end attached to control rod 138 and which extends to form arm 104. If annular element 100 were not present, control arm 142 would terminate at first end 143 at the point of connection to control rod 138, as opposed to extending beyond the connection point to form arm 104. Arm 104 is operatively connected to annular element 100 at slot 102. Arm 104 is in fitted engagement with slot 102 such that when arm 104 moves, annular element 100 rotates around cylindrical surface 129 of pump mounting surface 128.

Figure 7A:
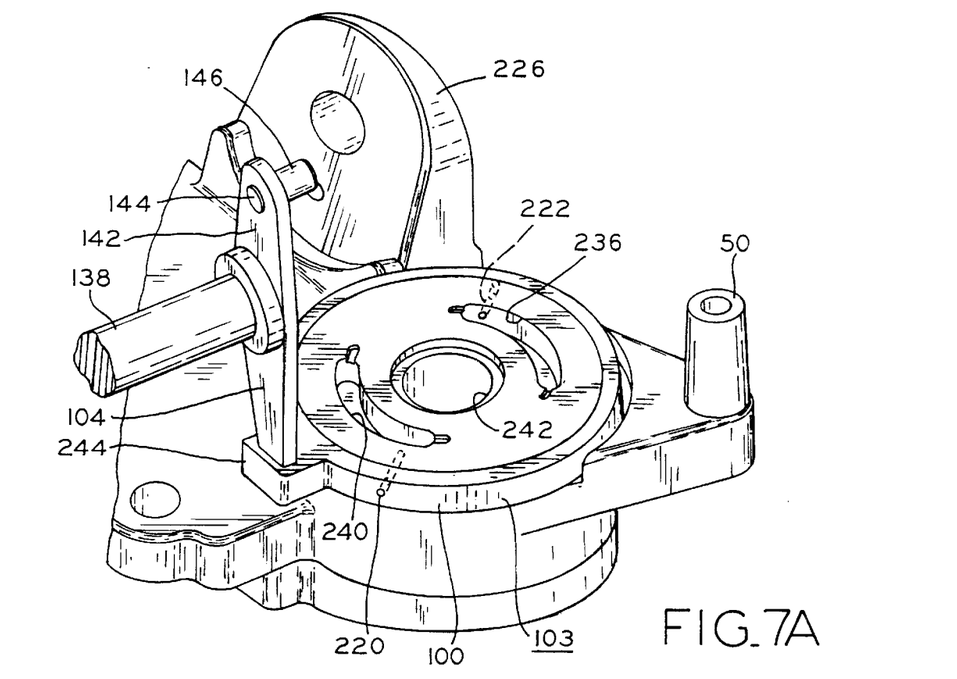
FIG. 7A is an upper perspective view of the center section or block, and the inventive mechanism of FIG. 6A, also showing the control device for the mechanism.
Figure 7B:
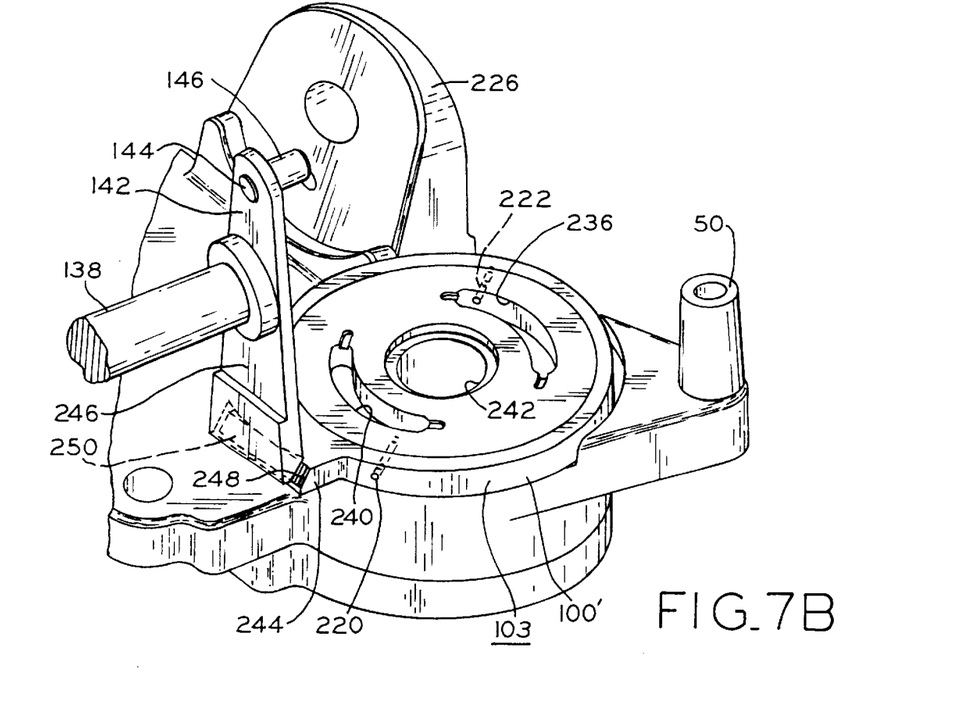
FIG. 7B is an upper perspective view of a hydrostatic transmission center section or block and a second embodiment of the dampening and neutral bleed mechanism, also showing the control device for the mechanism.
Figure 8A:
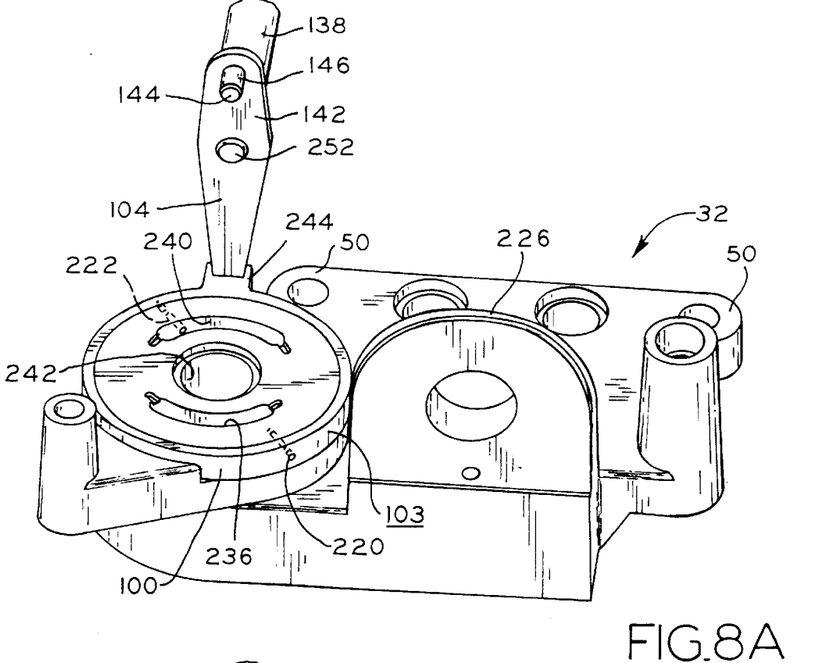
FIG. 8A is another upper perspective view of the center section or block, mechanism and control device of FIG. 7A.
Figure 8B:
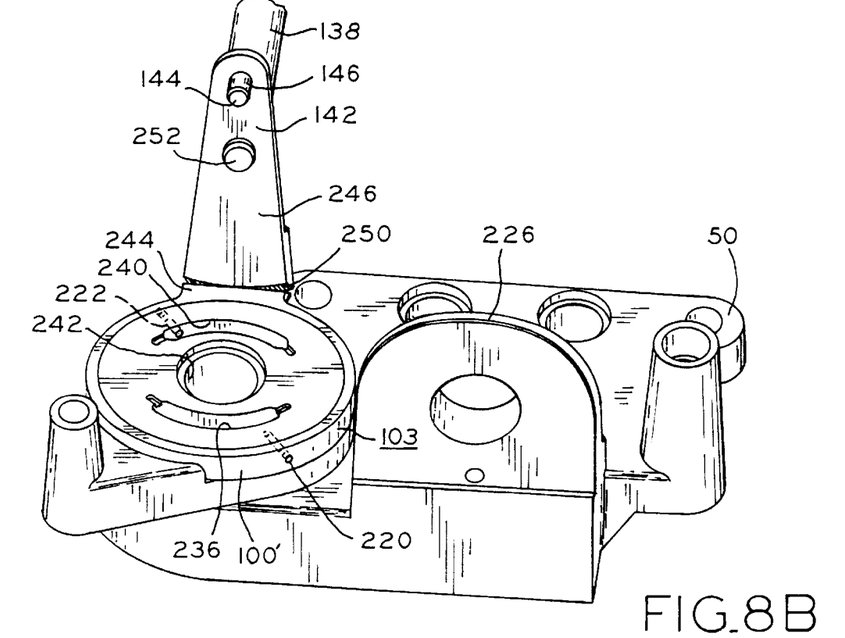
FIG. 8B is another upper perspective view of the center section or block, mechanism and control device of FIG. 7B.
Figure 9A:
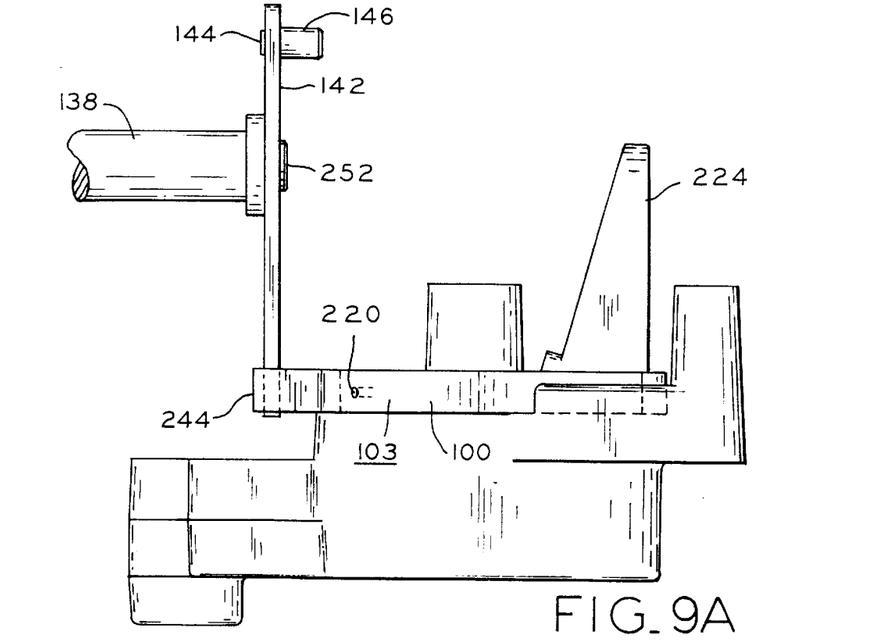
FIG. 9A is a side view of the center section or block, mechanism and control device of FIG. 7A.
Figure 9B:
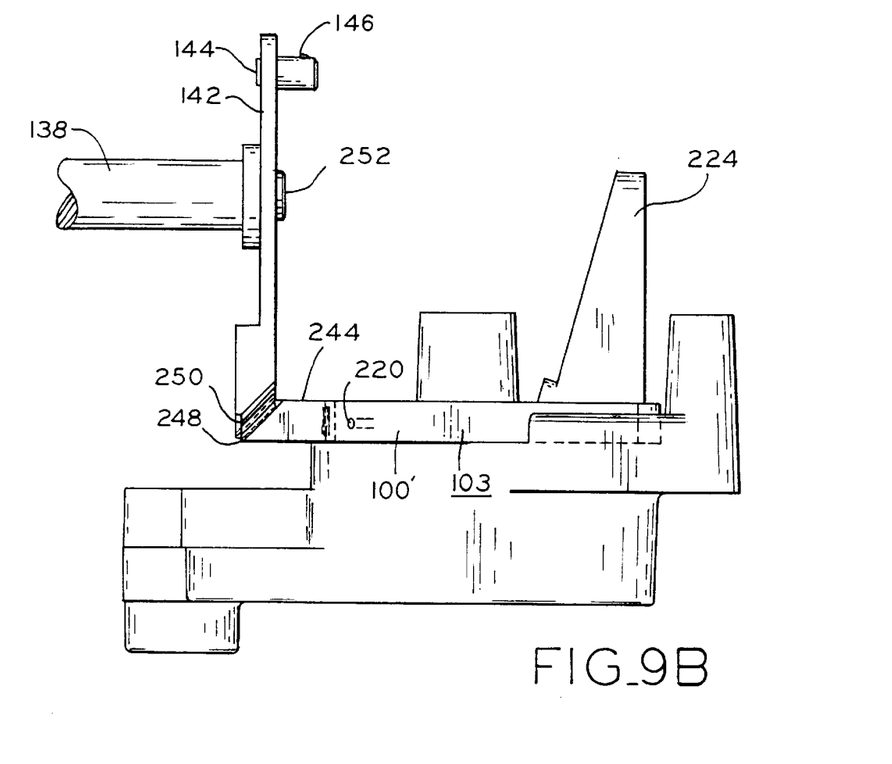
FIG. 9B is a side view of the center section or block, mechanism and control device of FIG. 7B.

A second embodiment, shown in FIGS. 7B, 8B, and 9B, utilizes a protrusion 244 on annular element 100', as does the first embodiment, but includes gear teeth 248 which are intermeshed with gear teeth 250 on arm 246. Arm 246, like arm 104, is connected to control arm 142, and may even be an extension thereof, the operation of arm 246 is similar to that of arm 104 with shift lever 136 through control arm 142 moving arm 246 into the neutral, forward, or reverse positions. The difference is that enmeshed gear teeth 248 and 250 provide operative engagement between arm 246 and element 100', versus an end of arm 104 being received in slot 102 of annular element 100.

The operation of hydrostatic pump and motor mechanism 34, through movement of swash plate 90 to effectuate variable rotational movement of motor cylinder barrel 42, will now be described with reference to FIGS. 2, 3 and 6A. Customarily, pump cylinder barrel 116 is driven by a power source through input shaft 84. Typically, input shaft 84 includes a first end keyed to common hub 252 of pulley 70 and fan 72 with pulley 70 being belt driven by a power source (not shown), thereby providing power to input shaft 84. The other end of input shaft 84 includes splined portion 108 disposed on the surface of input shaft 84 and engages matching splined portion 118 formed within pump cylinder barrel 116. Swash plate 90, selectively controlled by shift lever 136, which is external to transmission casing 28, initiates motive fluid displacement within pump cylinder barrel 116 to transfer power from input shaft 84 to drive axles 162, 164.

Figures 6B, 6C, 6D:
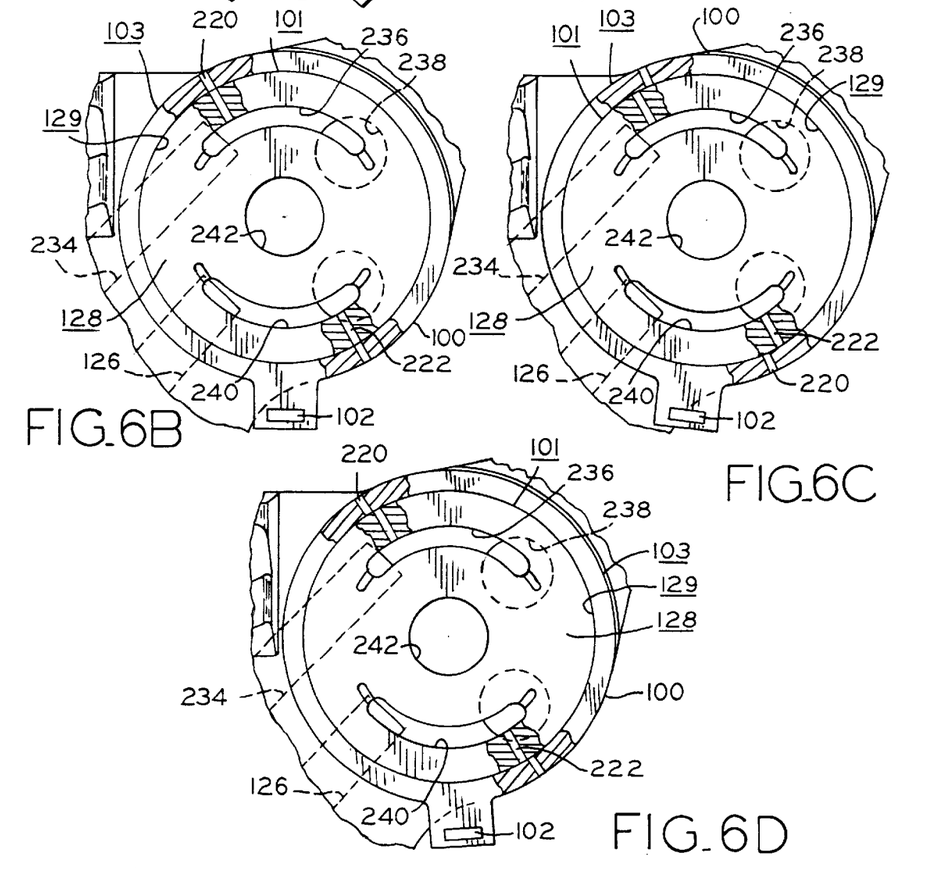
FIG. 6B is an enlarged, fragmentary view of the center section or block of FIG. 6A, showing in section the inventive mechanism in a fully neutral position.
FIG. 6C is an enlarged, fragmentary view of the center section or block of FIG. 6A, showing in section the inventive mechanism in a fully engaged, forward position.
FIG. 6D is an enlarged, fragmentary view of the center section or block of FIG. 6A, showing in section the inventive mechanism in a dampened, reverse position.

In operation, when shift lever 136 is moved in either direction, control arm 142 moves in an opposite direction, thereby causing swash plate 90 to pivot in a direction corresponding to that of shift lever 136. As control arm 142 moves, arm 104 is moved in the same direction as shift lever 136, thereby moving annular element 100 through the operative connection at slot 102. This motion allows voids 220 to either become radially aligned with fluid bleed holes 222 or to move out of radial alignment, depending upon whether the operator is selecting a neutral position, or a forward or reverse drive position. When shift lever 136 is moved to the neutral position, arm 104 causes annular element 100 to move in such a manner that voids 220 and fluid bleed holes 222 are in complete alignment, thereby allowing any motive fluid being displaced by pump 22 to bleed from center section 32 to the oil sump. When shift lever 136 is moved from neutral to forward, for example, annular element 100 is moved to a position in which voids 220 and fluid bleed holes 222 are not in alignment, thereby preventing motive fluid being displaced by the pump from being vented into the fluid sump, as shown in FIG. 6C. Similarly, when shift lever 136 is moved from neutral to reverse, voids 220 and holes 222 are not in alignment, as shown in FIG. 6D.

Although the neutral bleed aspect of annular element 100 has been discussed, element 100 and its movement, in addition to holes 222, provides a mechanism for dampening the change from neutral to one of the forward or reverse positions or vice versa. As element 100 approaches the neutral position, motive fluid begins to bleed from center section 32 to the oil sump as voids 220 and holes 222 approach alignment; however, as element 100 is moved away from the neutral position, motive fluid continues to bleed, albeit at a decreasing rate, as voids 220 and holes 222 move out of alignment. In either scenario, the change from one displacement rate to another occurs gradually as the fluid slowly begins to bleed or slowly stops bleeding. An example of a position where some damping is occurring is shown in FIG. 6D, in which voids 220 are not in complete alignment with holes 222, but are close enough for motive fluid to bleed, or seep, between surfaces 101 and 129 to voids 220 where it bleeds away. As annular element 100 rotates about cylindrical surface 129 of pump mounting surface 128, voids 220 and holes 222 move further apart thus slowing and eventually stopping motive fluid from bleeding from center section 32 though holes 222. This action occurs as annular element 100 is moved in either a forward or a reverse direction (FIG. 6D). The opposite of the above occurs when element 100 approaches neutral thereby damping the change until neutral is reached and motive fluid is allowed to bleed to prevent motion of the implement.

While this invention has been described as having exemplary designs, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A hydrostatic transmission comprising:
    a fluid motor;
    a variable displacement fluid pump in fluid communication with said fluid motor, said variable displacement fluid pump including a plurality of parallel axially oriented pistons, said pump having first fluid displacement rate and a second fluid displacement rate, said second fluid displacement rate being much greater than said first displacement rate, said variable displacement fluid pump including a swash plate assembly engaging said axially oriented pistons;
    a block on which said pump is mounted and having a cylindrical surface, said block provided with at least one fluid passage, fluid which flows from said pump to said motor being flowed through said passage, said block provided with at least one fluid bleed hole extending from said fluid passage to said cylindrical surface of said block; a fluid sump external to said block; and
    an annular element disposed about and in sliding contact with said cylindrical block surface, said annular element provided with at least one void and having a first position in which said void is in fluid communication with said fluid passage through said fluid bleed hole, and a second position in which said void is substantially out of fluid communication with said fluid passage; and
    wherein said fluid passage and said sump are in fluid communication through said bleed hole and said void when said pump is operating at its said first displacement rate and said annular element is in its said first position, and said fluid bleed hole and said sump are substantially out of fluid communication when said pump is operating at its said second displacement rate and said annular element is in its said second position.

2. The hydrostatic transmission of claim 1, wherein said void is a hole extending through said annular element.

3. The hydrostatic transmission of claim 2, wherein said hole extends radially through said annular element.

4. The hydrostatic transmission of claim 1, wherein when said fluid passage and said sump are in fluid communication, said void and said fluid bleed hole are in alignment, said alignment between said void and said fluid bleed hole is radial alignment.

5. The hydrostatic transmission of claim 1, wherein said pump has a neutral position and a drive position, said pump operating at its said first displacement rate when in its said neutral position, said pump operating at its said second displacement rate when in its said drive position.

6. The hydrostatic transmission of claim 5, wherein said hydrostatic transmission is reversible, said drive position is one of a forward and a reverse position, and said block is provided with two fluid passages,
    fluid which flows from said pump to said motor being flowed through one of said two fluid passages when said pump is in its said forward position and through another of said two fluid passages when said pump is in its said reverse position,
    said block provided with at least one said fluid bleed hole extending between each said fluid passage and said block cylindrical surface, and said annular element is provided with at least two voids,
    each said fluid passage being in fluid communication with said sump through a said bleed hole and a said void when said pump is operating at its said first displacement rate.

7. The hydrostatic transmission of claim 1, further comprising a casing, said pump and said block being located in said casing.

8. The hydrostatic transmission of claim 7, wherein said sump is located in said casing.

9. The hydrostatic transmission of claim 7, wherein said motor is located in said casing.

10. The hydrostatic transmission of claim 9, wherein said motor is mounted to said block.

11. The hydrostatic transmission of claim 1, wherein said first fluid displacement rate and said second fluid displacement rate being selected through movement of said swash plate assembly, said swash plate assembly having a first position at which said pump operates at its said first displacement rate, said swash plate having a second position at which said pump operates at its said second displacement rate, and said annular element and said swash plate assembly are in operative engagement, said annular element being moved between its said first and second positions simultaneously with said swash plate assembly being moved between its said first and second positions.

12. The hydrostatic transmission of claim 11, further comprising a movable control rod, said swash plate assembly and said annular element both operatively coupled to said control rod, said swash plate assembly and said annular element being moved in response to movement of said control rod.

13. The hydrostatic transmission of claim 12, wherein said control rod movement is rotational.

14. The hydrostatic transmission of claim 13, wherein said control rod further comprises an arm, said arm extending between and operatively engaging said swash plate assembly and said annular element.

15. The hydrostatic transmission of claim 14, wherein said arm has an end and said annular element has a slot, said arm end received in said slot, whereby said control rod and said annular element are operatively engaged.

16. The hydrostatic transmission of claim 1, wherein said first fluid displacement rate is substantially zero.

17. The hydrostatic transmission of claim 1, wherein said fluid bleed hole and said void are in complete alignment in said annular element first position, and are completely out of alignment in said annular element second position, said bleed hole and said void being in partial alignment as said annular element is moved between its said first and second positions, restricted fluid communication between said fluid passage and said sump existing during said partial alignment, whereby said fluid passage and said sump are gradually brought into and substantially out of fluid communication through said void and the response of said motor to changes between said first and second pump displacement rates is dampened.

18. A hydrostatic transmission comprising:
a fluid motor;
a variable displacement fluid pump in fluid communication with said fluid motor, said pump having first fluid displacement rate and a second fluid displacement rate, said second fluid displacement rate being much greater than said first displacement rate;
a block on which said pump is mounted and having a cylindrical surface, said block provided with at least one fluid passage, fluid which flows from said pump to said motor being flowed through said passage, said block provided with at least one fluid bleed hole extending from said fluid passage to said cylindrical surface of said block;
a fluid sump external to said block; and
an annular element disposed about and in sliding contact with said cylindrical block surface, said annular element provided with at least one void and having a first position in which said void is in fluid communication with said fluid passage through said fluid bleed hole, and a second position in which said void is substantially out of fluid communication with said fluid passage;
a movable control rod, said swash plate assembly and said annular element both operatively coupled to said control rod, said swash plate assembly and said annular element being moved in response to movement of said control rod, said control rod movement being rotational, said control rod further comprises an arm, said arm extending between and operatively engaging said swash plate assembly and said annular member; and wherein said fluid passage and said sump are in fluid communication through said bleed hole and said void when said pump is operating at its said first displacement rate and said annular element is in its said first position, and said fluid bleed hole and said sump are substantially out of fluid communication when said pump is operating at its said second displacement rate and said annular element is in its said second position;

wherein said pump includes a swash plate assembly, said first fluid displacement rate and said second fluid displacement rate being selected through movement of said swash plate assembly, said swash plate assembly having a first position at which said pump operates at its said first displacement rate, said swash plate having a second position at which said pump operates at its said second displacement rate, and said annular element and said swash plate assembly are in operative engagement, said annular element being moved between its said first and second positions simultaneously with said swash plate assembly being moved between its said first and second positions;

wherein said arm and said annular element are each provided with gear teeth, said arm and annular element gear teeth being intermeshed, whereby said control rod and said annular element are operatively engaged.

19. A hydrostatic transmission comprising:
a fluid motor having a plurality of parallel axially oriented pistons rotating about a motor central axis;
a variable displacement fluid pump in fluid communication with said fluid motor, said variable displacement fluid pump having a plurality of parallel axially oriented pistons rotating about a pump central axis, said pump having first fluid displacement rate and a second fluid displacement rate, said second fluid displacement rate being much greater than said first displacement rate, said pump further including a swash plate assembly engaging said axially oriented pistons;
a pump and motor block on which said pump and said motor are mounted such that said motor central axis and said pump central axis are oriented substantially 90° relative to each other, said block having a flat surface against which said pump is slidably engaged when said pump is operating at its said first and second fluid displacement rates, said block provided with at least one fluid passage which opens to said flat block surface, fluid which flows from said pump to said motor being flowed through said passage;
a fluid sump external to said block; and
means for placing said passage and said sump in fluid communication when said pump is operating at its said first fluid displacement rate and providing a gradual motor response to changes between said pump first and second fluid displacement rates.

20. The hydrostatic transmission of claim 19, wherein said means for placing and providing further comprises means for maintaining said passage and said sump substantially out of fluid communication when said pump is operating at its said second displacement rate.

21. The hydrostatic transmission of claim 20, wherein said swash plate assembly has neutral and drive positions, said pump having its said first displacement rate in response to said swash plate assembly being in its said neutral position, said first displacement rate being almost zero, said pump having its said first displacement rate in response to said swash plate assembly being in its said drive position, said passage and said sump being placed into and substantially out of fluid communication simultaneously with movements of said swash plate assembly toward its said neutral and drive positions, respectively.

22. A method for dampening the response of a fluid motor to changes in an axial piston fluid pump between neutral and drive positions in a hydrostatic transmission, and ensuring that no fluid is pumped by the pump to the motor in the pump neutral position, comprising:

rotating the pump while maintaining its sliding engagement against a block having a passage therethrough;

operating the rotating pump at a first displacement rate in its neutral position, in which the passage and a sump are in fluid communication, whereby fluid displaced by the pump in its neutral position is directed to the sump;

rotating an annular element surrounding the block in a first direction and gradually decreasing the fluid communication between the passage and the sump while changing from the pump neutral position to the pump drive position;

operating the rotating pump at a second displacement rate greater than the first displacement rate in its drive position, in which the passage and the sump are substantially out of fluid communication, whereby fluid displaced by the pump in its drive position is directed to the motor through the passage for driving the motor; and rotating the annular element in a second direction and gradually increasing the fluid communication between the passage and the sump while changing from the pump drive position to the pump neutral position.

23. The method of claim 22, further comprising gradually placing the passage and the sump into fluid communication by rotating a rotating member engaged with the block and having a void provided therein to position in which the void is in fluid communication with the passage, and gradually placing the passage and the sump substantially out of fluid communication by rotating the rotating member to a position in which the void is substantially out of fluid communication with the passage.

24. The method of claim 23, wherein rotation of the rotating member and movement between the pump neutral and drive positions is simultaneous.

* * * * *